United States Patent
Williamson et al.

(10) Patent No.: US 6,959,516 B2
(45) Date of Patent: Nov. 1, 2005

(54) INSECT AND MICROORGANISM CONTROL FOR BUILDINGS

(75) Inventors: Robert R. Williamson, Dallas, TX (US); Norwin C. Derby, West Tawakoni, TX (US); Cynthia B. Finley, Dallas, TX (US); Bradley Matthew Eisenbarth, Sherman, TX (US)

(73) Assignee: Super Sack Mfg. Corp., Dallas, TX (US)

( * ) Notice: Subject to any disclaimer, the term of this patent is extended or adjusted under 35 U.S.C. 154(b) by 82 days.

(21) Appl. No.: 10/453,538

(22) Filed: Jun. 4, 2003

(65) Prior Publication Data

US 2003/0205007 A1 Nov. 6, 2003

Related U.S. Application Data

(60) Division of application No. 10/108,735, filed on Mar. 27, 2002, and a continuation-in-part of application No. 09/478,907, filed on Jan. 7, 2000, now Pat. No. 6,370,834.

(51) Int. Cl.[7] .............................................. A01K 3/00
(52) U.S. Cl. ........................................ 52/101; 52/741.3
(58) Field of Search ................................ 52/101, 741.3

(56) References Cited

U.S. PATENT DOCUMENTS

| 4,996,052 A | * | 2/1991 | McIntosh ..................... 427/421 |
| 5,392,559 A | * | 2/1995 | Long ............................ 43/121 |
| 5,474,739 A | * | 12/1995 | Triestram et al. ............. 422/40 |
| 5,860,266 A | * | 1/1999 | Martinet et al. ........... 52/741.3 |
| 6,156,328 A | * | 12/2000 | Alcott et al. ................ 424/405 |
| 6,370,834 B1 | * | 4/2002 | Nickell et al. ............. 52/741.3 |

* cited by examiner

Primary Examiner—Carl D. Friedman
Assistant Examiner—Steve Varner
(74) Attorney, Agent, or Firm—Michael A. O'Neil (57) ABSTRACT

The intrusion of insects into a home or similar building is controlled by utilizing insect and/or microorganism controlling plastic materials in the construction of the building. The insect and/or microorganism controlling plastic building materials are manufactured by first blending one or more plastic resins with one or more insect and/or microorganism controlling chemical agents to form a blended plastic resin/insect and/or microorganism controlling chemical agent material. The blended plastic resin/insect and/or microorganism controlling chemical agent material is then utilized to manufacture plastic films, sheets, nonwoven fabrics, woven fabrics, insulating foams, flooring materials, wall covering materials, and the like utilizing conventional manufacturing techniques.

1 Claim, 6 Drawing Sheets

```
┌─────────────────────────────────────────────┐
│   Blend Plastic Resin(s) and Microorganism  │
│       Controlling Chemical Agents           │
└─────────────────────┬───────────────────────┘
                      │
┌─────────────────────┴───────────────────────┐
│   Manufacture Microorganism Controlling     │
│         Plastic Building Materials          │
└─────────────────────┬───────────────────────┘
                      │
┌─────────────────────┴───────────────────────┐
│   Construct Building Using Microorganism    │
│    Controlling Plastic Building Materials   │
└─────────────────────────────────────────────┘
```

INSECT AND MICROORGANISM CONTROL FOR BUILDINGS

CROSS-REFERENCE TO RELATED APPLICATIONS

This is a continuation-in-part application under 37 C.F.R. §1.63 of application Ser. No. 09/478,907 filed Jan. 7, 2000, currently U.S. Pat. No. 6,370,834, as is also a division of application Ser. No. 10/108735 filed Mar. 27, 2002.

TECHNICAL FIELD

The present invention relates generally to the prevention of damage and other problems caused by the entry of insects and microorganisms into buildings, and more particularly to plastic materials having one or more chemical agents contained therein which are adapted for applications in and around buildings to prevent insect- and microorganism-related problems.

BACKGROUND AND SUMMARY OF THE INVENTION

As is well known, termites, carpenter ants, and other wood eating insects annually cause hundreds of millions of dollars in damage to homes and similar buildings. Fleas and ticks similarly cause injury to pets, working animals such as hunting dogs, livestock, and humans. Insects such as roaches and houseflies, while not causing direct damage, are considered to be disease carriers. For these and other reasons the total exclusion of insects from residences and similar buildings is considered to be highly desirable.

Heretofore insect control has generally been accomplished by spraying or otherwise applying insecticides and similar chemical agents in and around the building to be protected. Termites and similar insects are sometimes controlled by applying chemical agents beneath the surface of the soil surrounding free standing buildings such as homes, and the like. However, notwithstanding numerous advances in the art of insect control over the years, insects continue to cause substantial problems for owners and occupants of homes and similar buildings. Thus, the need exists for still further improvements in the art.

As is also well known, the presence of microorganisms within homes and other buildings can lead to serious problems. For example, over the past several years damage caused by black mold has resulted in millions of dollars in insurance claims. Prior to the present invention there has not been an effective means of preventing the entry of microorganisms into buildings.

In accordance with the broader aspects of the present invention, one or more insect and/or microorganism controlling chemical agents are incorporated into plastic film, plastic sheeting, nonwoven fabrics formed from plastic materials, woven fabrics formed from plastic materials, and other plastic materials. The plastic materials having the insect and/or microorganism controlling chemical agents contained therein are then used in the construction and maintenance of homes and similar buildings. For example, plastic material having insect and/or microorganism controlling chemical agents contained therein can be utilized as a vapor barrier between the foundation of the building and the structure constructed thereon. Plastic material having insect and/or microorganism controlling agents contained therein can also be used as a wrap surrounding the exterior walls of the building. Plastic material having insect and/or microorganism controlling agents contained therein can also be used within the interior of the building for applications such as flooring materials, wall coverings, insulation materials, etc. Plastic material having insect and/or microorganism controlling agents contained therein may also be deployed as a wrap around the insulation batts that are installed in the building.

In accordance with a first embodiment of the invention, plastic materials such as polyethylene, polypropylene, polyurethane, polystyrene, etc. are doped with the insect controlling chemical agent Fipronil, the chemical formula for which is 5-amino-1-[2,6-dichloro-4-trifluoromethyl)phenyl]-4-[(1,R,S)-(trifluoromethyl)sulfinyl]-1-H-pyrazole-3-carbonitrile and are thereby rendered insecticidal. The insect controlling chemical agent is preferably added to the resin which is utilized in the manufacture of plastic building materials prior to the manufacturing steps which are employed to convert the resin into the desired plastic product. Subsequently, the plastic material having the insect controlling chemical agent contained therein is utilized in the construction and maintenance of homes and similar buildings. When properly employed, the insect controlling plastic materials of the present invention can be successful in totally excluding insects from homes and similar buildings.

In accordance with a second embodiment of the invention, plastic materials such as polyethylene, polypropylene, polyurethane, polystyrene, etc. are doped with the insect controlling chemical agent sold by Techmer PM, LLC under the designation PM 12211E63 and are thereby rendered insecticidal. The insect controlling chemical agent is preferably added to the resin which is utilized in the manufacture of plastic building materials prior to the manufacturing steps which are employed to convert the resin into the desired plastic product. Subsequently, the plastic material having the insect controlling chemical agent contained therein is utilized in the construction and maintenance of homes and similar buildings. When properly employed, the insect controlling plastic materials of the present invention can be successful in totally excluding insects from homes and similar buildings.

In accordance with a third embodiment of the invention, plastic materials such as polyethylene, polypropylene, polyurethane, polystyrene, etc. are doped with the microorganism controlling chemical agent sold by Techmer PM, LLC under the designation PM 12224E63 and are thereby rendered antimicrobial. The microorganism controlling chemical agent is preferably added to the resin which is utilized in the manufacture of plastic building materials prior to the manufacturing steps which are employed to convert the resin into the desired plastic product. Subsequently, the plastic material having the microorganism controlling chemical agent contained therein is utilized in the construction and maintenance of homes and similar buildings. When properly employed, the microorganism controlling plastic materials of the present invention can be successful in totally preventing damage to homes and similar buildings due to black mold and other microorganisms.

BRIEF DESCRIPTION OF THE DRAWINGS

A more complete understanding of the present invention may be had by reference to the following Detailed Description when taken in connection with the accompanying Drawings wherein.

DETAILED DESCRIPTION

Figure 1:
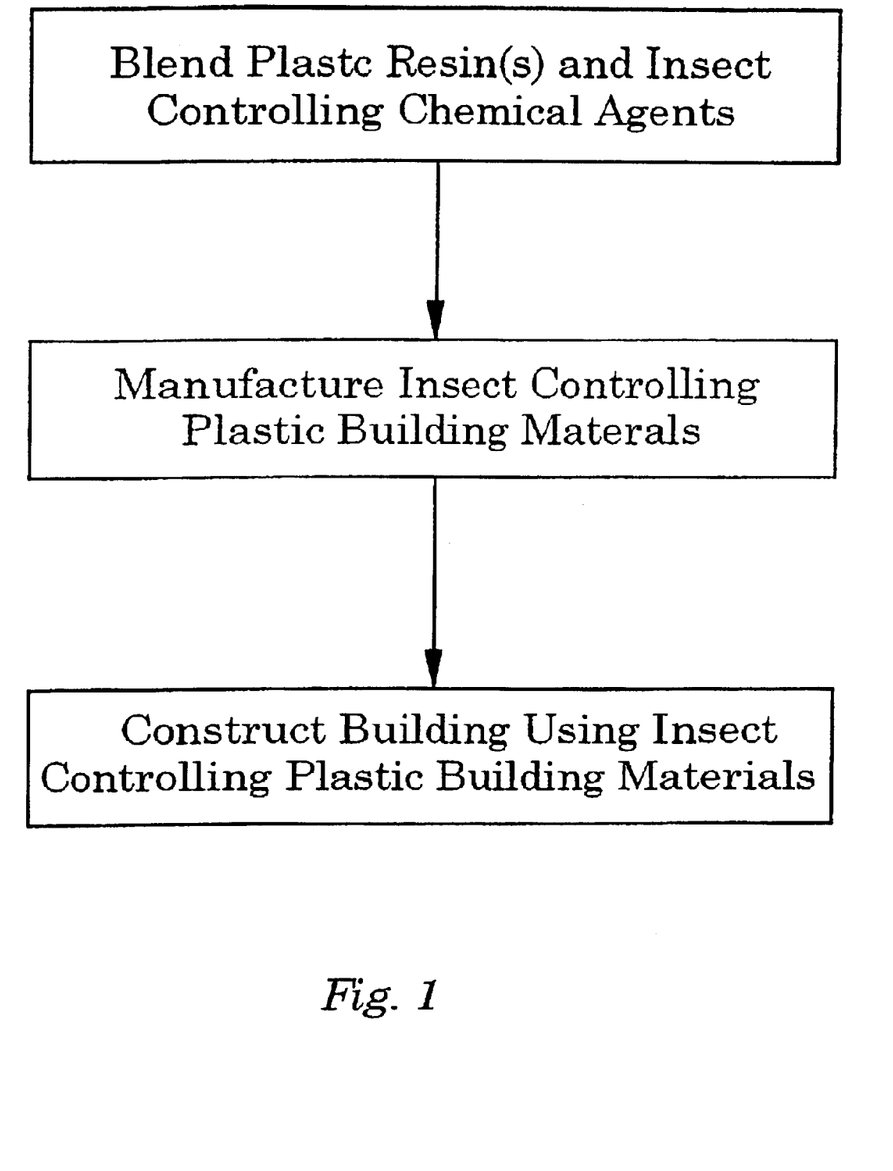
FIG. 1 is flow chart illustrating the broader aspects of the invention.
Figure 10:
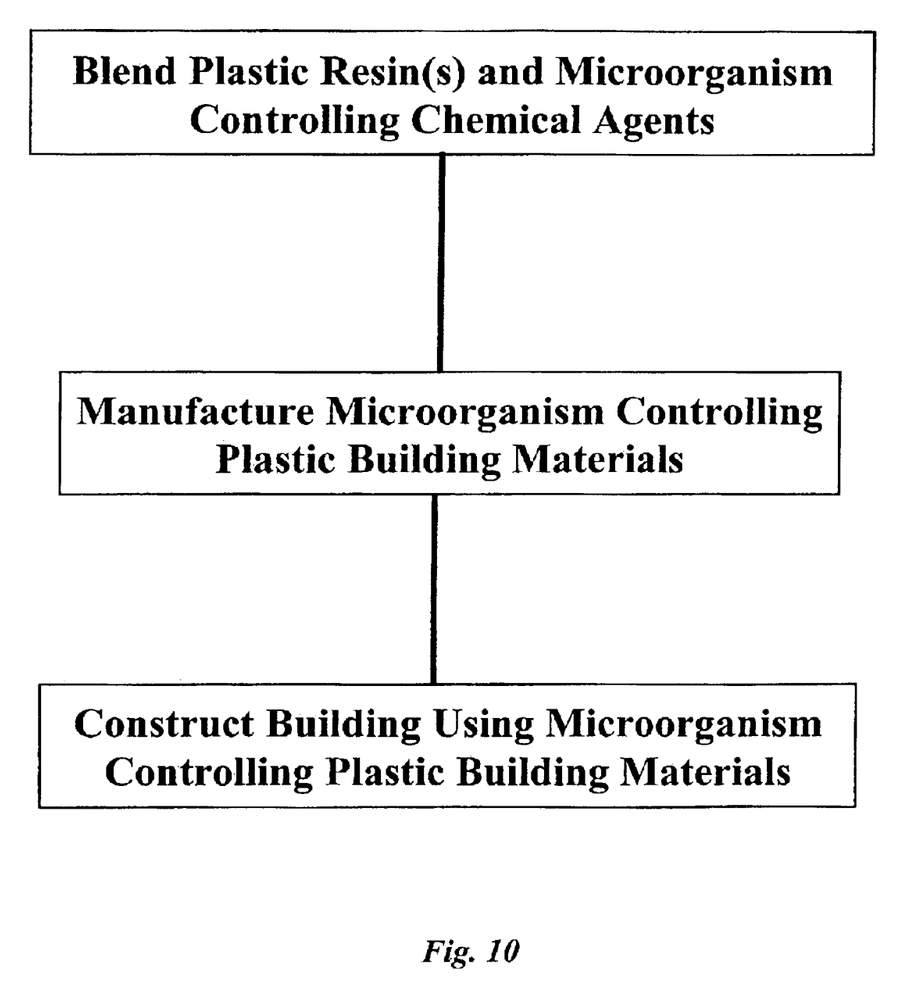
FIG. 10 is a flow chart further illustrating the invention.

Referring now to the Drawings, and particularly to FIGS. 1 and 10 thereof, the practice of the present invention begins with the blending of one or more insect and/or microorganism controlling chemical agents into one or more plastic resins. The chemical agent or agents are selected from the group of insect and/or microorganism controlling chemical agents having an effective life extending over several decades. The amount of the chemical agent or agents to be blended with the plastic resin or resins is likewise selected to prolong the effective life of the combined material in controlling insects and/or microorganisms. The plastic resin or resins utilized in the practice of the invention are selected from those materials conventionally utilized in building construction, such as polyethylene, polypropylene, polyurethane, polystyrene, etc.

After the selected insect and/or microorganism controlling chemical agent or agents and the selected plastic resin or resins have been blended, the blended material is utilized in the manufacture of insect controlling plastic building materials. Preferably, conventional manufacturing techniques are employed in the practice of the invention. For example, the blended plastic resin/insect and/or microorganism controlling chemical agent material may be utilized in the manufacture of plastic films by extrusion or other well known film manufacturing techniques. The blended plastic resin/insect and/or microorganism controlling chemical agent material may be utilized in the manufacture of nonwoven fabrics utilizing well known techniques. Likewise, the blended plastic resin/insect and/or microorganism controlling chemical agent material may be utilized in the manufacture of plastic foams utilized in conventional foam manufacturing techniques. The blended plastic resin/insect and/or microorganism controlling chemical agent material may be utilized in the manufacture of flooring materials and/or wall coverings also utilizing well known manufacturing techniques. The blended plastic resin/insect and/or microorganism controlling chemical agent material may be used in the manufacture of woven fabrics also using well known manufacturing techniques.

The resulting insect and/or microorganism controlling plastic building materials are ultimately utilized in the construction of homes and similar buildings in accordance with well established construction practices. For example, insect and/or microorganism controlling plastic film manufactured in accordance with the present invention may be utilized as a moisture barrier between the foundation and the subfloor of a home or similar building or between the underlying earth and the subfloor of a home or similar building depending on the particular construction technique that is utilized. Plastic films and/or nonwoven plastic fabrics constructed in accordance with the present invention may be utilized as a wrap surrounding the exterior walls of a home or similar building. Insect and/or microorganism controlling plastic foam manufactured in accordance with the present invention may be utilized as insulation in the floors, walls, and/or ceilings of a home or similar building. Insect and/or microorganism controlling flooring materials and/or wall coverings may be utilized within the interior of a home or similar building. Insect and/or microorganism controlling materials may be used to wrap insulation batts which are installed in buildings either during construction or as a part of maintenance.

Figure 2:
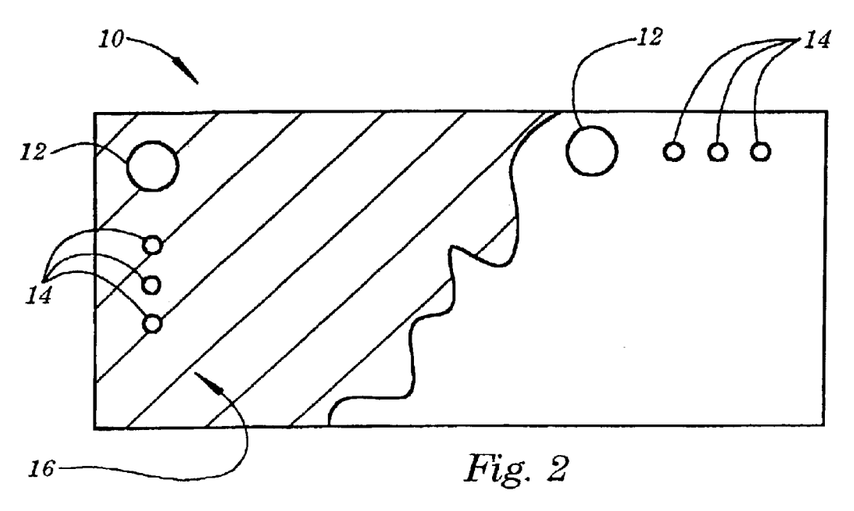
FIG. 2 is a diagrammatic illustration of a first application of the invention.

FIGS. 2, 3, 4, 5, 6, 7, 8, and 9 illustrate particular applications of the present invention. Referring particularly to FIG. 2, there is shown a concrete slab 10 of the type commonly utilized in the construction of homes and similar buildings. The slab 10 has conventional large apertures 12 and small apertures 14 formed therein at diverse locations. The apertures 12 and 14 as well as other conventional apertures formed through the slab 10 are utilized to serve as drains from and as plumbing and electrical supplies to the building constructed on the slab 10.

A moisture barrier 16 is positioned over the top surface of the slab 10 prior to the construction of a building thereon. The moisture barrier 16 is manufactured in accordance with the present invention and as such comprises a plastic resin/insect and/or microorganism controlling chemical agent blend which is utilized to manufacture the moisture barrier 16 in accordance with conventional moisture barrier manufacturing techniques. For example, the moisture barrier 16 may be manufactured utilizing conventional extrusion techniques. Other manufacturing techniques for manufacturing the moisture barrier 16 will readily suggest themselves to those skilled in the art.

After the moisture barrier 16 is installed on the slab 10 the remainder of the building comprising a home or other similar building is constructed thereon. As is well known, insects such as termites, carpenter ants, and other insects frequently enter a home or similar building through cracks or spaces which exist between the foundation slab and the building constructed thereon. Similarly, microorganisms such as black mold enter the building through cracks or spaces which exist between the foundation slab and the building constructed thereon. In the practice of the present invention such problem is eliminated because insects and/or microorganisms entering the space between the slab 10 and building constructed thereon are killed by contact with the moisture barrier 16 having one or more insect and/or microorganism controlling chemical agents therein.

Figure 3:
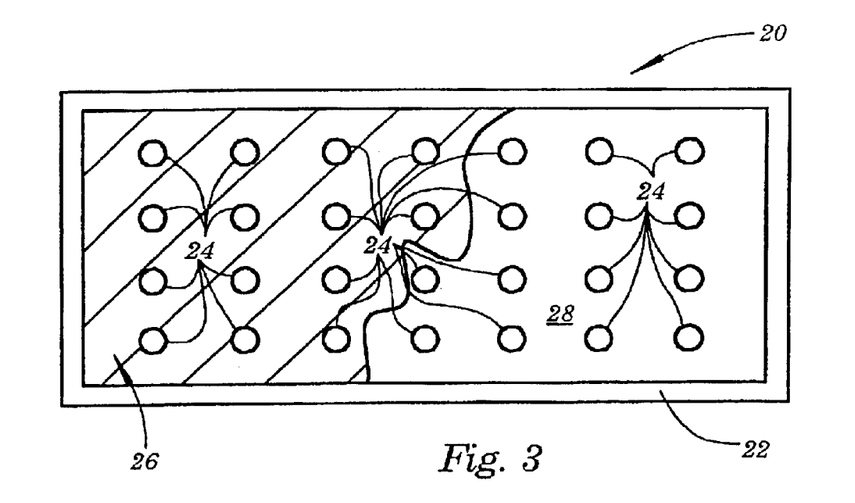
FIG. 3 is a diagrammatic illustration of a second application of the invention.

Referring to FIG. 3, there is shown a pier and beam-type foundation 20 of the type commonly utilized in the construction of homes and similar buildings. The pier and beam foundation comprises a perimeter wall 22 and a plurality of piers 24 which are typically, but not necessarily exclusively located within the boundary defined by the perimeter wall. The foundation 20 is provided with a moisture barrier 26 constructed in accordance with the present invention which is located between the underlying earth 28 and the subfloor of the building to be constructed on the foundation 20.

The moisture barrier 26 preferably comprises a layer of plastic film having one or more insect and/or microorganism controlling chemical agents contained therein. The moisture barrier 26 is manufactured from a blend of one or more plastic resins and one or more insect and/or microorganism controlling agents. The blended plastic resin/insect and/or microorganism controlling chemical agent material is formed into a plastic sheet comprising the moisture barrier 26 utilizing conventional manufacturing techniques. For example, the moisture barrier 26 may be manufactured utilizing conventional extrusion techniques or other conventional techniques well known in the industry for manufacturing plastic films and sheets.

Figure 4:
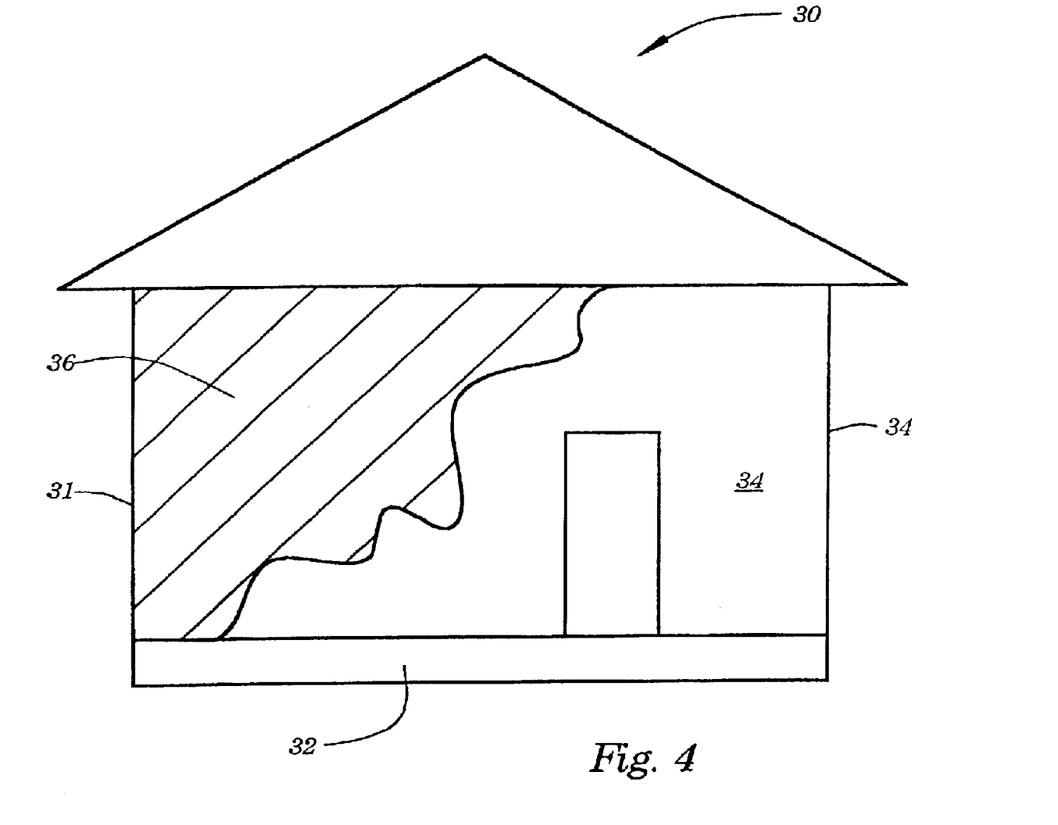
FIG. 4 is a diagrammatic illustration of a third application of the invention.

Referring to FIG. 4, there is shown a home or similar building 30 which has been constructed in accordance with conventional home building techniques. The building 30 includes a foundation 32 which may be provided with a moisture barrier of the type illustrated in FIG. 1 or FIG. 2 and described hereinabove in conjunction therewith. The building 30 further comprises a plurality of walls 34. The walls 34 are provided with a wrap 36 manufactured in accordance with the present invention.

The wrap 36 comprises plastic film or sheeting having one or more insect controlling chemical agents contained therein. Preferably, the wrap 36 is manufactured from a blend of one or more plastic resins and one or more insect and/or microorganism controlling chemical agents. The blended plastic resin/insect and/or microorganism controlling chemical agent material is formed into plastic sheeting utilized in techniques commonly employed in such manufacture.

For example, the plastic film or sheeting comprising the wrap 36 may be manufactured utilizing conventional extrusion techniques. The wrap 36 may also comprise a nonwoven fabric having one or more insect and/or microorganism controlling chemical agents contained therein, in which case the wrap 36 is manufactured utilizing techniques conventionally employed in the manufacture of plastic nonwoven fabrics. More specifically, the wrap 36 may be of the type sold by Dupont under the trademark "TYVEK"® which is modified to include one or more insect and/or microorganism controlling chemical agents. The wrap 36 may also comprise the nonwoven material sold by Reemay under the mark "TYPAR®" which is modified to include one or more insect and/or microorganism controlling chemical agents.

As is well known, insects and/or microorganisms often enter a house or similar building through cracks and apertures formed in the walls thereof. When the wrap 36 of the present invention is employed, insects gaining access to the house or building 30 through the walls thereof immediately engage the wrap 36, whereupon such insects are killed. Similarly, microorganisms are killed before they can enter the building. Thus, the wrap 36 is useful in preventing insects and/or microorganisms from entering the house or building 30.

Figure 5:
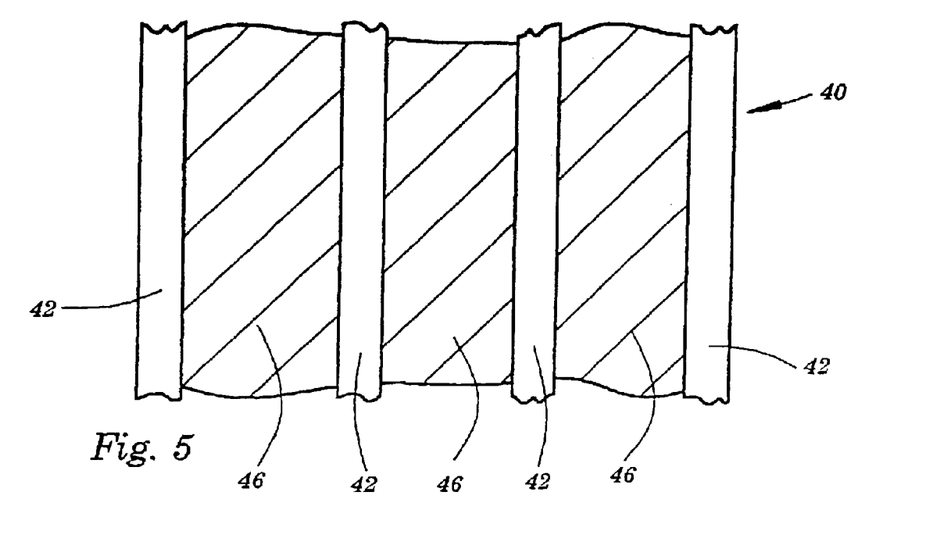
FIG. 5 is a diagrammatic illustration of a fourth application of the invention.

Referring to FIG. 5, there is shown a construction 40 comprising the wall, ceiling, or floor of the type utilized in the construction of homes and similar buildings. The construction 40 includes a plurality of structural members 42 comprising wall studs, ceiling joists, floor joists, etc. Between the structural members 42 there is provided sections of plastic foam insulation 46 constructed in accordance with the present invention.

The plastic foam insulation is preferably manufactured utilizing a blend of one or more plastic resins and one or more insect and/or microorganism controlling chemical agents. The blended plastic resin/insect and/or microorganism controlling chemical agent material is manufactured into plastic foam utilizing conventional plastic foam manufacturing techniques. Other plastic insulation manufacturing techniques may be utilized in the practice of the present invention, if desired.

As is well known, insects and/or microorganisms often gain access to the interior of a home or similar building through the walls, ceiling, or floor thereof. When the present invention is employed, insects attempting to enter a home or similar building through the walls, ceiling, or floor thereof immediately engage the plastic foam insulation 46, whereupon such insects are immediately killed. Similarly, microorganisms are killed before they enter the building.

Figure 6:
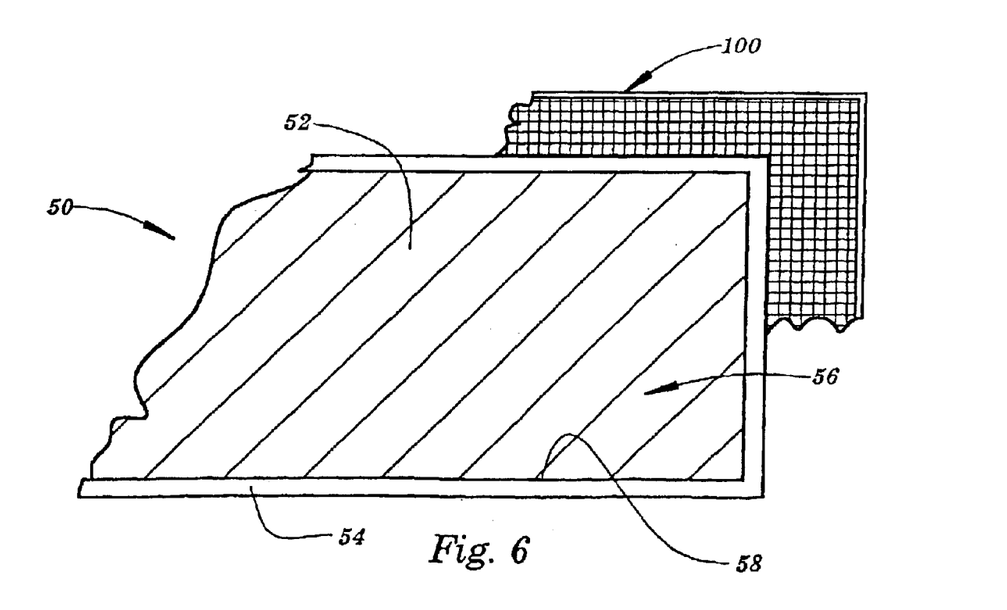
FIG. 6 is a diagrammatic illustration of a fifth application of the invention.

Referring to FIG. 6, there is shown a section 50 comprising part of the interior of a home or similar building. The construction 50 includes a plurality of walls 52 and a floor 54, all of which are constructed in accordance with conventional building techniques. The walls 52 of the section 50 may be provided with a wall covering 56 manufactured in accordance with the present invention. Likewise, the floor 54 may be provided with a floor covering 58 manufactured in accordance with the present invention.

The wall covering 56 is preferably manufactured utilizing a blend of one or more plastic resins and one or more insect and/or microorganism controlling chemical agents. The blended plastic resin/insect and/or microorganism controlling chemical agent material is manufactured into wall covering utilizing conventional wall covering manufacturing techniques. Likewise, the blended plastic resin/insect and/or microorganism controlling chemical agent material is manufactured into floor covering utilizing conventional floor covering manufacturing techniques.

Figure 7:
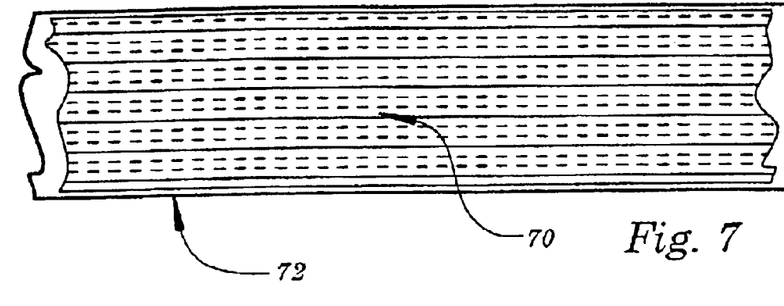
FIG. 7 is a diagrammatic illustration of a sixth application of the invention.

Referring to FIG. 7, there is shown a length of insulating material 70 of the type that is commonly manufactured from fiberglass, rock wool, and similar insulating materials. The length of insulating material 70 takes the form of a batt which is typically dimensioned for installation between the studs or joists of a building. As is well known, the batt comprising the length of insulating material 70 may be encased in a plastic film wrap 72 formed from polyethylene, polypropylene, and/or similar plastic materials. The use of the wrap 72 is particularly advantageous in the case of fiberglass insulation in that it protects against painful skin irritations on the part of insulation installing personnel.

In accordance with the present invention, the plastic film wrap 72 surrounding the length of insulating material 70 is manufactured utilizing a blend of one or more plastic resins and one or more insect and/or microorganism controlling chemical agents. The blended plastic resin/insect and/or microorganism controlling chemical agent material is manufactured into plastic film utilizing conventional plastic film manufacturing techniques. When installed in a building, the plastic wrap 72 prevents insects and/or microorganisms from entering the building through the space between the structural members comprising the building and the insulating material installed therebetween.

Figure 8:
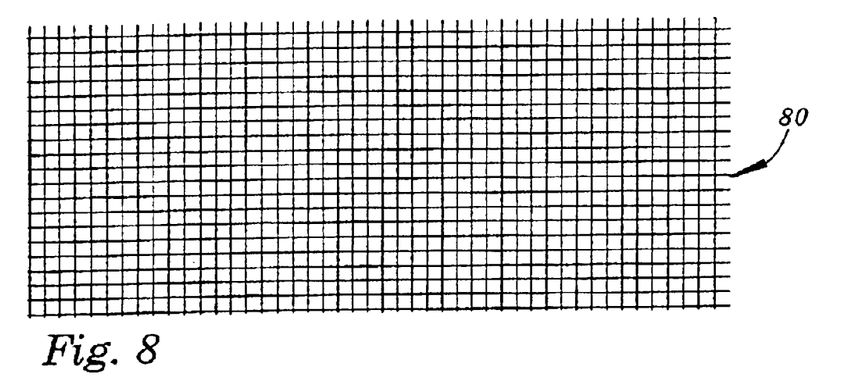
FIG. 8 is a diagrammatic illustration of a seventh application of the invention.

Referring to FIG. 8, there is shown a section of woven plastic fabric 80 constructed in accordance with the present invention. The woven plastic fabric 80 is preferably manufactured utilizing a blend of one or more plastic resins and one or more insect and/or microorganism controlling chemical agents. The blended plastic resin/insect and/or microorganism controlling chemical agent material is manufactured into woven plastic fabric utilizing conventional woven plastic fabric manufacturing techniques. For example, the fabric may be manufactured by first forming the blended plastic resin/insect and/or microorganism controlling chemical agent material into a length of plastic film. Next, the plastic film is slit to provide a multiplicity of plastic filaments. The plastic filaments are thereafter woven to form the insect controlling woven plastic fabric of the present invention. Other well known techniques for manufacturing woven plastic fabrics may also be utilized in the practice of the invention, if desired.

Figure 9:
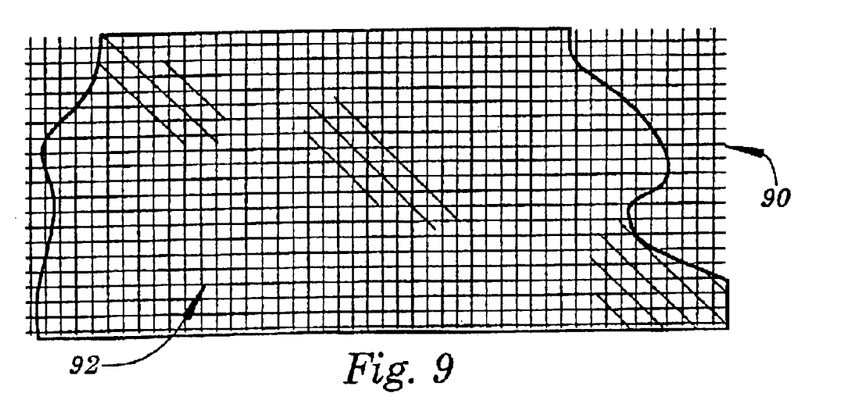
FIG. 9 is a diagrammatic illustration of an eighth application of the invention.

Having reference to FIG. 9, there is shown a woven plastic fabric 90 having a layer of insect controlling plastic material formed thereon. In accordance with the embodiment of FIG. 9, the woven plastic fabric 90 may be conventional in nature, and may be manufactured using any of the various well known techniques for fabricating woven plastic fabrics. The layer 92 is preferably manufactured utilizing a blend of one or more plastic resins and one or more insect and/or microorganism controlling chemical agents. The blended plastic resin/insect and/or microorganism controlling chemical agent material is manufactured into insect and/or microorganism controlling plastic coating material utilizing conventional plastic coating material manufacturing techniques. The insect and/or microorganism controlling plastic coating material is then applied to the fabric 90 using conventional techniques.

For example, the layer 92 may be formed on the fabric 90 by means of extrusion, coating, spraying, etc. Alternatively, the layer 92 may be separately formed then secured on the fabric 90 utilizing conventional heat sealing or adhesive bonding techniques. Optionally, the layer 92 may be provided with apertures to permit the flow of water therethrough.

Referring again to FIG. 7, a length of woven plastic fabric 100 incorporating the present invention may be deployed around the exterior of the building either during the construction of the building or as a part of maintenance procedures. The length of woven plastic fabric 100 is preferably manufactured either as illustrated in FIG. 8 or as illustrated in FIG. 9. Regardless of the technique utilized in its manufacture, the length of woven plastic fabric 100 comprises an insect and/or microorganism controlling layer which may be deployed on top of or somewhat under the surface of the soil surrounding a building. Preferably, the length of insect and/or microorganism controlling woven plastic fabric 100 is deployed in accordance with well known techniques conventionally utilized in the control of termites and other insects.

Those skilled in the art will appreciate and understand the fact that the present invention comprises a variety of building materials each manufactured from a blended plastic resin/insect and/or microorganism controlling chemical agent material which is transformed into a variety of building materials utilizing conventional manufacturing techniques. Each of the building materials manufactured in accordance with the invention contains one or more insect and/or microorganism controlling chemical agents. Thus, when building materials manufactured in accordance with the present invention are utilized in the construction of a house or similar building, such materials deny access to the house or building by termites, carpenter ants, fleas, ticks, roaches, houseflies, other undesirable insects, black mold, and other undesirable microorganisms.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A method of protecting buildings from intrusion by microorganism comprising the steps of:

blending at least one plastic resin with at least one microorganism controlling chemical agent;

utilizing the blended the plastic resin/microorganism controlling chemical agent material to manufacture an microorganism controlling plastic building material;

utilizing the microorganism controlling plastic building material in the construction of a home or similar building;

wherein the blended plastic resin/microorganism controlling chemical agent material is utilized in the manufacture of woven plastic fabric, and wherein the woven plastic fabric is deployed around the exterior of a building to prevent the entry of microorganisms therein.

* * * * *